Oct. 8, 1946.   H. S. LENDERMON   2,408,937
TWO-WHEELED HANDLE GUIDE TRACTOR
Filed July 13, 1945

INVENTOR.
HOMER S. LENDERMON
BY
*J. Ledermann*
ATTORNEY

UNITED STATES PATENT OFFICE 2,408,937

TWO-WHEELED HANDLE GUIDE TRACTOR

Homer S. Lendermon, Searcy, Ark.

Application July 13, 1945, Serial No. 604,805

3 Claims. (Cl. 180—19)

This invention relates to agricultural machinery and implements, and aims to provide a two-wheeled handle guide tractor to which any of an assortment of farm tools or implements may be solidly attached. Such a tractor possesses features and advantages not obtainable in the case of the common four-wheeled tractor, among which may be mentioned maneuverability and the ease with which sharp turns and deviations may be made, simplicity, and economy.

The above as well as additional and more detailed objects will be set forth in the following description, wherein characters of reference refer to like-numbered parts in the accompanying drawing. It is to be noted that the drawing is intended for the purpose of illustration only, and that it is neither desired nor intended to limit the invention in any manner to the specific details of construction excepting insofar as they may be deemed essential to the invention.

Referring briefly to the drawing.

Figure 1:
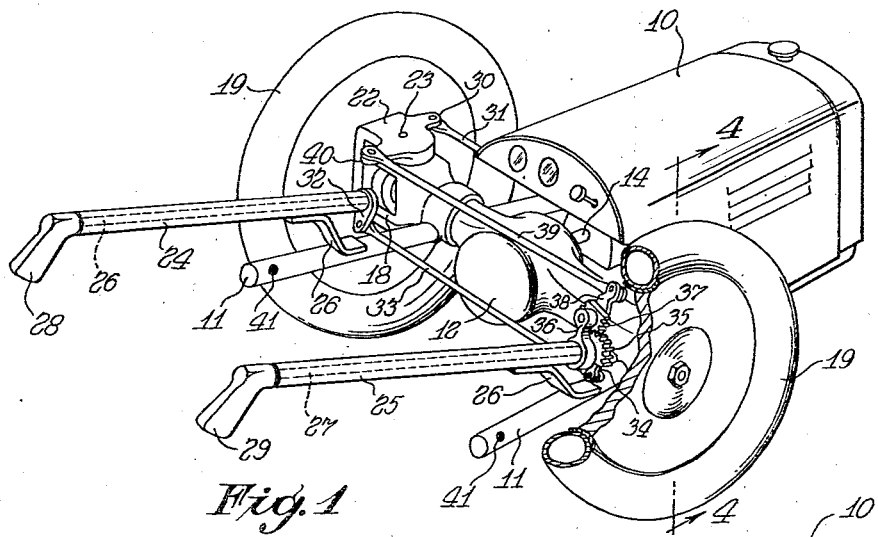
Fig. 1 is a perspective view of the two-wheeled handle guide tractor, with parts broken away and partly in section.
Figure 2:
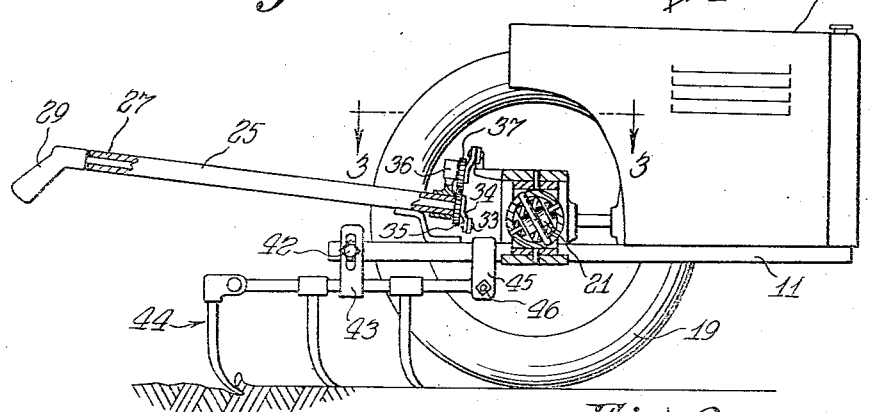
Fig. 2 is a side elevational view of the tractor, showing one form of farm tool attached thereto, partly in section on the line 2—2 of Fig. 4, and with parts broken away.
Figure 3:
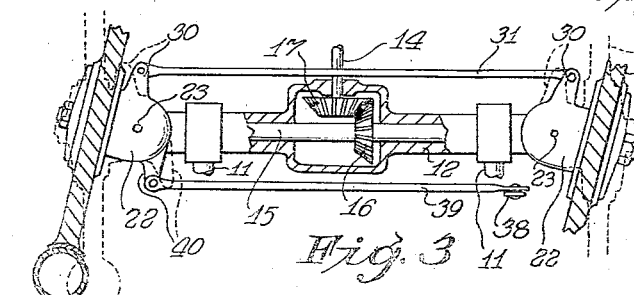
Fig. 3 is a cross-sectional view taken on the line 3—3 of Fig. 2.
Figure 4:
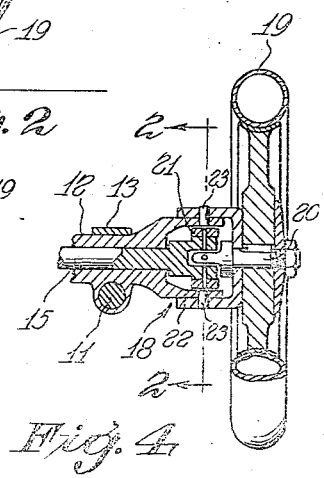
Fig. 4 is a cross-sectional view taken on the line 4—4 of Fig. 1.

Referring in detail to the drawing, the numeral 10 indicates generically the hooded motor which would naturally be a gasoline internal combustion engine, and the same is supported on a pair of spaced substantially horizontal frame members or bars 11. Also supported on the members 11 is the axle and differential housing 12, and the housing may be secured thereon by any suitable means such as, for instance, straps 13.

The drive shaft of the engine is shown at 14, and for the sake of simplicity the wheel axle 15 is indicated as solid and driven through its bevel gear 16 by a bevel gear 17 on the drive shaft 14. The ends of the housing 12 are enlarged to provide yoke-like enclosures for universal joint connections between the axle 15 and the wheels 19, as shown at 18, the wheels having shafts 20 keyed therein. The two universal joints are indicated by the numeral 21, and they may of course be constructed in accordance with any suitable or standard principles. Vertical aligned openings pass through the enlarged housing ends 18, and secured to each wheel is a shell 22, or yoke, which registers about the yoke 18 and has similar aligned openings. Pins 23 passing through the upper and lower aligned openings mentioned, pivotally attach the wheel yokes 22 to the housing yokes 18.

A pair of handles 24 and 25 are secured by bracket supports 26 in upwardly inclined position on the frame bars 11. The handles, or handle bars, 25, are hollow or tubular, and have rods 26 and 27, respectively, passing therethrough, and on their outer extremities the rods have handle grips 28 and 29, respectively, rigid thereon. Ears 30 extend from the tops of the yokes 22 and are pivotally connected to each other by a rod 31. A lug 32 is rigid on the inner end of the rod 26 and a rod 33 is pivoted to its outer end. A similar lug 34 is rigid on the inner end of the rod 27, and the other end of the rod 33 is pivoted in the outer end of the lug 34. Also rigid on the rod 27 is a sector gear 35. A bracket 36 extending upward from the handle bar 25 pivotally supports a second sector gear 37 having a lug 38 extending upward therefrom. A rod 39 has one end pivotally secured to the lug 38 and the other to an ear 40 on the side of the top yoke member 22 which is opposite to the ear 30. It is thus apparent that a pair of parallelogram linkages have been provided, the first comprising the rods 39 and 33 together with the ear 40, lug 38, lug 32, and lug 34, and the second comprising the rod 39, ear 40 and lug 38, and the rod 31 and ears 30. It is thus also apparent that the turning of either hand grip 28 or 29 will cause both to turn in synchronism and will, through the linkages described, cause the wheels 19 to be steered in one direction or the other.

The motor of the tractor illustrated may of course be small, and no attempt has been made to indicate or describe any control means for the motor as such means would be of any suitable standard construction and arrangement.

Near the free ends of the frame bars 11, bolt holes 41 are provided receptive of bolts 42 whereby brackets 43 extending from a tool 44 may be secured to the bars. Yokes 45 on the tool may also be slid over the bars or fixed thereto in any desired manner, and if the bolts 42 and 46 are made removable it is apparent that the tool 44 may readily be removed and replaced by another, as desired.

The linkages described connecting the hand grips 28 and 29 to the wheels 19 make steering of the tractor possible with a minimum of effort.

Obviously, modifications in form and structure may be made without departing from the spirit and scope of the invention.

I claim:

1. A tractor comprising a substantially horizontal frame having an engine supported thereon, an axle, a housing enclosing said axle and supported on said frame, a drive shaft extending from the engine to said axle, the ends of said housing being enlarged and having yokes formed thereon, wheels having yokes extending therefrom, said wheel yokes being pivoted on said housing yokes, said wheels having axles keyed thereto, universal joints connecting said wheel axles with the extremities of said first named axle, gears connecting said drive shaft with said first named axle, rigid handle bars supported on said frame, said handle bars being hollow and having rods extending therethrough, said rods having hand grips on the outer extremities thereof, and means connecting said wheel yokes with the inner extremities of said rods for steering said wheels upon turning of said hand grips, said frame having means for attaching a farm tool thereto.

2. The device set forth in claim 1, said first-named means comprising lugs on said inner extremities of said rods, a rod having its ends pivoted to said lugs, ears extending from one side of said wheel yokes and having a rod pivoted thereto, a sector gear rigid with one of said lugs, a second sector gear pivotally mounted above said first sector gear and in mesh therewith, said second sector gear having a lug extending therefrom, one of said wheel yokes having an ear extending from the other side thereof, and a rod pivotally connected between said last-named ear and said last-named lug.

3. The device set forth in claim 1, said frame comprising a pair of spaced substantially horizontal bars.

HOMER S. LENDERMON.